US005553206A

United States Patent [19]

Meshkat

[11] Patent Number: 5,553,206
[45] Date of Patent: Sep. 3, 1996

[54] METHOD AND SYSTEM FOR PRODUCING MESH REPRESENTATIONS OF OBJECTS

[75] Inventor: Siavash N. Meshkat, San Jose, Calif.

[73] Assignee: International Business Machines Corporation, Armonk, N.Y.

[21] Appl. No.: 17,074

[22] Filed: Feb. 12, 1993

[51] Int. Cl.⁶ .................................................. G06T 17/20
[52] U.S. Cl. ........................................ 395/123; 395/119
[58] Field of Search ................................. 395/119, 120, 395/140, 141, 123

[56] References Cited

U.S. PATENT DOCUMENTS

| | | | |
|---|---|---|---|
| 3,889,107 | 6/1975 | Sutherland | 235/152 |
| 4,440,532 | 4/1984 | D'Apuzzo | 408/229 |
| 4,502,257 | 3/1985 | Diamond | 52/80 |
| 4,534,813 | 8/1985 | Williamson et al. | 156/212 |
| 4,646,251 | 2/1987 | Hayes et al. | 364/518 |
| 4,785,399 | 11/1988 | Evans et al. | 364/300 |
| 4,912,644 | 3/1990 | Aoyama et al. | 364/472 |
| 4,930,092 | 5/1990 | Reilly | 364/522 |
| 4,933,889 | 6/1990 | Meshkat et al. | 364/578 |
| 4,995,813 | 2/1991 | Francioni | 434/96 |
| 5,020,002 | 5/1991 | Malachowsky | 364/518 |
| 5,046,988 | 9/1991 | Bennett | 446/487 |
| 5,100,358 | 3/1992 | Volgger | 446/104 |
| 5,101,444 | 3/1992 | Wilson et al. | |
| 5,104,125 | 4/1992 | Wilson | 273/157 |
| 5,125,038 | 6/1992 | Meshkat et al. | 382/22 |
| 5,128,872 | 7/1992 | Malachowsky et al. | 395/162 |
| 5,222,202 | 6/1993 | Koyamada | |
| 5,315,537 | 5/1994 | Blacker | |
| 5,345,490 | 9/1994 | Finnigan et al. | |
| 5,497,452 | 3/1996 | Shimizu et al. | 395/120 |

FOREIGN PATENT DOCUMENTS

| | | |
|---|---|---|
| 0339272A2 | 2/1989 | European Pat. Off. |
| 405106 | 2/1991 | European Pat. Off. |
| WO9203196 | 3/1992 | Germany |
| 63-178372 | 7/1988 | Japan |
| 227146 | 7/1990 | United Kingdom |

OTHER PUBLICATIONS

Atkinson, Gargantini, and Ramanath, Determination of the 3D Border by Repeated Elimination of Internal Surfaces, 1984, pp. 279–295.

Foley, Van Dam, Feiner and Hughes, PRW Computer Graphics Principles and Practice, 1990, pp. 533–557; 1040–1041.

W. J. Schroeder et al., Geometry–Based Fully Automatic Mesh Generation and the Delaunay Triangulation, International Journal for Numerical Methods in Eng. vol. 26, 2503–2515, 1988.

(List continued on next page.)

Primary Examiner—Heather R. Herndon
Assistant Examiner—Rudolph Buchel
Attorney, Agent, or Firm—James C. Pintner

[57] ABSTRACT

A method is provided for producing a mesh representation of an arbitrarily shaped object, for applications such as finite element analysis. The method includes the identifying elements of a mesh, such as a tetrahedral mesh, which are suitable, based on predetermined criteria, for merging into one of a predetermined set of target elements. For instance, if the predetermined set of target elements includes pentahedra and hexahedra, and the method operates on a tetrahedral mesh, then tetrahedra of the mesh are identified based on known ways of decomposing the target elements into tetrahedra. The groups of tetrahedra are identified based on whether they share faces in common, and whether they have faces which share a common edge and which are either coplanar or have an angle between the faces which satisfies a predetermined condition. The latter faces are referred to as quadrilateral pairs. A graph representation of the mesh is used, preferably including nodes representing regions of the mesh (i.e., tetrahedra) and edges between the nodes representing faces shared in common and quadrilateral pairs of faces. Using a search tree representation of a graph of a target element, the graph of the mesh is searched to identify subsets of the graph of the mesh, which represent groups of the tetrahedra of the mesh which are suitable for merging into the target element. By merging the tetrahedra this way, the total number of elements of the mesh is reduced, compared with the original tetrahedral mesh.

12 Claims, 11 Drawing Sheets

OTHER PUBLICATIONS

J. Ruppert et al., On the Difficulty of Tetrahedralizing 3-Dimensional Non-Convex Polyhedra, Proc. 5th ACM Symp. on Computational Geometry, 1989.

B. Chazelle, Triangulating a nonconvex Polytope, ACM 0-89791-318-3/89/0006/0393-400.

Bern, Provably Good Mesh Generation, IEEE Symp. on Found of Computer Science, 31st, pp. 231-241, 1990.

A. Appel et al., Program for the Interactive Design of Polyhedra, IBM TDB vol. 14, No. 7, pp. 2037-2045, Dec. 1971.

J. C. Cavendish et al., An Approach to Automatic Three-Dimensional Finite Element Mesh Generation, International Journal for Numerical Methods in Eng., vol. 21, 329-347, 1985.

J. G. Hocking et al., Topology, Geometric Complexes and Polytopes Polytopes & Triangulated Spaces and Geometric Complexes and Polytopes, pp. 198-207, 1988.

C. L. Liu, Introduction to Combinatorial Mathematics, Chapter 8, Planar and Dual Graphs, pp. 206-233, 1968.

Meshkat et al., Three-Dimensional Automatic Unstructured Grid Generation Based on Delaunay Tetrahedrization, Num. Grid Generation in Comutational Fluid Dynamics and Related Fields, Elsevier Science Publishers B. V. (North-Holland, pp. 841-853, 1991.

S. Moore et al., Adaptive Mesh Generation I: Packing Space, International Journal of Computational Geometry and Applications, Oct. 22, 1990.

N. Sapidis et al., Domain Delaunay Tetrahedrization of Arbitrarily Shaped Curved Polyhedra Defined in a Solid Modeling System, ACM/SIGGRAPH Symposium on Solid Modeling Foundations & CAD/CAM Applications, Feb. 27, 1991.

M. Senechal, Which Tetrahedra Fill Space?, Mathematics Magazine, vol. 54, No. 5, pp. 227-243, Nov. 1981.

O. C. Zienkiewicz, Finite Elements and Approximation, 1983 Piecewise Defined Trial Functions and The Finite Element Method, pp. 126-132 and Higher-Order Finite Element Approximation, pp. 178-192.

V. Srinivasan, L. R. Nackman, J-M Tang, S. N. Meshkat, Automatic Mesh Generation Using the Symmetric Axis Transformation of Polygonal Domains, Proccedings of the IEEE, vol. 80, No. 9, ISSN 0018-9219, pp. 1485-1501, Sep. 1992.

S. C. Agarwal and W. N. Waggenspack Jr., Decomposition Method for Extracting Face Topologies from Wireframe Models, Computer Aided Design, UK, vol. 24, No. 3, ISSN 0010-4485, pp. 123-140, Mar. 1992.

P. K. Goenka and K. P. Oh, A Three-dimensional Mesh Generation Technique, Proceedings of the 1984 International Computers in Eng. Conf. and Exhibit, pp. 727-735, Aug. 12, 1984.

| | |
|---|---|
| LINK | 1,2 |
| QUAD | 1,2 |
| LINK | 2,3 |
| LINK | 2,4 |
| LINK | 3,4 |
| LINK | 3,5 |
| QUAD | 1,5 |
| QUAD | 3,5 |
| LINK | 4,6 |
| QUAD | 1,6 |
| QUAD | 5,6 |
| QUAD | 4,6 |

FIG. 15

| | |
|---|---|
| LINK | 1,2 |
| LINK | 1,3 |
| LINK | 2,3 |
| LINK | 1,4 |
| QUAD | 1,4 |
| LINK | 2,5 |
| QUAD | 1,5 |
| QUAD | 2,5 |
| LINK | 3,6 |
| QUAD | 1,6 |
| QUAD | 5,6 |
| QUAD | 3,6 |

FIG. 16

```
Break the solid into tetrahedra
while there is an open triangle left
    if there is any open quad pair of triangles
        randomly pick t to be one such triangle
    else if there is any open boundary triangle
        randomly pick t to be one such triangle
    else
        randomly pick t to be any open triangle
    for each rooted tree S
        T = the tetrahedron to the right of t
        assign T to the root node of S
        for each edge in the tree S
            assign it to an open triangle τ of T
            if the constraints are not satisfied
                un-assign the triangle τ
                backtrack
            else
                T = the tetrahedron to the right of t
                assign T to the root node of S
            end
        end
        if all edges of S are assigned
            compute score for this assignment
        end
    end
    pick the tree S with the highest score for t
    flag all the nodes of the tree as closed
end
```

FIG. 17

METHOD AND SYSTEM FOR PRODUCING MESH REPRESENTATIONS OF OBJECTS

FIELD OF THE INVENTION

The present invention relates generally to the field of computer modeling and graphical display. More specifically, the invention relates to the field of representing an object in terms of topological elements for applications such as finite element analysis.

BACKGROUND OF THE INVENTION

Various computer graphics applications call for modeling objects. This modeling may be done for purposes such as computation and rendering, and numerical analysis using the finite element analysis method. A solid object is conveniently modeled by creating a mesh of points having a geometry corresponding with that of the object being modeled. Many applications require that an object being modeled, having an arbitrary shape, be modeled by decomposing the object into a set of simple elements such as tetrahedra. For each tetrahedron, a calculation is made to determine a physical attribute of the object, under a predetermined condition. The physical attribute could be shading, vibrational displacement responsive to a predetermined forcing function, a temperature gradient, etc. Then, the graphic representation of the object as a whole is shaded or deformed, using the calculated values for the tetrahedra.

Each element is made up of vertices (nodes), edges, and faces, and each element defines a region enclosed within its faces. In a mesh, there are predefined rules about how two elements may be geometrically connected. For instance it might be required that any two elements be either disjoint, or share one or more vertices. Alternatively, it might be required that any two elements share a whole face, edge, vertex, or nothing. Such rules have been referred to as a "geometric complex" in Hocking et al., "Topology", Mineola, N.Y.: Dover Publications, Inc. (1988), pp. 199–206. Hocking et al. defined a geometric complex as a collection of properly joined geometric simplices, wherein, for each geometric simplex which belongs to the geometric complex, every face of that geometric simplex also belongs to the geometric complex. Simplices are "properly joined" if their intersection is either the empty set or a subsimplex of each of the simplices.

Geometric simplices are defined for various numbers of dimensions. A geometric 0-simplex is a single point, a geometric 1-simplex is a closed line segment, a geometric 2-simplex is a closed triangular plane region, a geometric 3-simplex is a solid tetrahedron, and so on. The present invention is primarily concerned with three-dimensional modeling of arbitrarily shaped objects as a geometric complex. Geometric 3-simplices, i.e., tetrahedra, are thus properly joined if they have a face in common.

Some applications allow an object to be modeled by a mesh including different elements, such as tetrahedra, pentahedra, and hexahedra. Other applications require that only a single type of element, such as only tetrahedra, be used. Different criteria determine the desirable form a mesh should take. A balanced mixture of different elements might be desirable due to technical reasons, such as providing better system performance, or to human preference, for easier visualization of the results. If an object includes several components, or has portions made of different materials, then it is required that the boundaries of the elements of the mesh representation conform to the boundaries between the components or portions. In many applications, the total number of elements making up the mesh should preferably be as small as possible.

Therefore, the problem of how to model an arbitrarily shaped object with a mesh to optimize visual appearance and system performance, minimize the total number of elements, or achieve other desired results, is a challenge which faces systems designers.

Conventional systems and methods have focused on decomposing an object into only tetrahedra. For instance U.S. Pat. No. 5,010,501, issued to Arakawa and titled "Three-Dimensional Geometry Processing Method and Apparatus Therefor", discloses a method in which a grid, defined by planes perpendicular to the coordinate axes, is superimposed on a geometric region. See, for instance FIG. 3(b) of Arakawa. Elements defined by the grid are then dissected into tetrahedra. The Arakawa method has several disadvantages. First, because of the imposed grid, the number of tetrahedra produced is likely to be very large, while it would be preferable to keep the number as small as possible. Second, because of the imposed grid, the resulting tetrahedra probably will not follow the natural shape and contour of the geometric region. Also, the method does not handle curved surfaces well, and is well-suited only for 2.5 dimensional regions, that is, regions such as prisms or cut-outs from a sheet of finite thickness material, which do not vary in one direction.

Another method is taught in U.S. Pat. No. 3,889,107, issued to Sutherland and titled "System of Polygon Sorting by Dissection." In the Sutherland method, a region, defined by a polygonal surface, is dissected by dissection planes which intersect the edges of the polygons making up the surface. Thus, the dissection follows the form of the region (to a degree), rather than following an imposed coordinate axis. However, the Sutherland method also has drawbacks. It does not handle regions with curved surfaces well, and may also produce an undesirably large number of pieces. In addition, a small change to the geometry produces global changes in the decomposition. That is, a small change to the shape of one face causes the dissection plane for an edge of the face to move, and change the decomposition throughout the region.

Still another approach was made, in part, by the present inventor in U.S. Pat. No. 4,933,889, titled "Method for Fine Decomposition in Finite Element Mesh Generation." In this method, a domain represented by a polygonal boundary is divided into elements which generally correspond with Voronoi regions, that is, regions which are closer to respective ones of the polygonal line segments or reflex vertices between line segments. Symmetric axes are used as the basis for decomposition. As shown in the drawings of the '889 patent, this method is an improvement over other conventional systems in that the elements more closely follow the natural shape and contour of the polygonal surface of the region. However, this patent does not address the problem of three-dimensional decomposition.

Cavendish et al., "An Approach to Automatic Three-Dimensional Finite Element Mesh Generation", International Journal for Numerical Methods in Engineering, Vol. 21, pp. 329–347 (1985) describes a method for generating a mesh by inserting node points within and on the boundary of the structure to be meshed, and triangulating the node points to form a network of well-proportioned elements.

For finite element analysis, any tetrahedron should fall either totally within or totally outside of the body. If a tetrahedron crosses a boundary of the body, it must be subdivided into two or more tetrahedra which meet this requirement. Thus, the first step of the Cavendish method is employed.

To accomplish the latter step, Delaunay triangulation and/or tetrahedrization is used. The Delaunay method involves creating a tetrahedral mesh representation of a body such that, if a circumsphere is defined to contain any given one of the tetrahedra (i.e., the four vertices of the tetrahedron are on the surface of the circumsphere), no mesh points fall within the circumsphere's volume. As a consequence, the elements (triangles or tetrahedra) tend to be well-proportioned.

However, the Cavendish method is likely to produce a mesh having an undesirably large number of elements, and it does not address how the number of elements can be reduced.

The present inventor also contributed to the invention of U.S. Pat. No. 5,125,038, titled "Face and Edge Trim Method for An Automatic Mesh Generation System". This method produces a mesh of tetrahedra according to the Delaunay method. The '038 patent teaches a method for meeting this requirement by producing an initial mesh, adding a vertex point on any body edge which does not coincide with an edge of one of the finite elements (i.e., tetrahedra) making up the mesh, and creating additional finite elements by adding edges between the new vertex point and nearby vertices. The method of the '038 patent also includes locating a finite element having a first edge coincident with a body edge and a second edge passing through a face of the body, placing a new vertex point on the body face in the vicinity of the second edge of the finite element, so as to minimize the number of added required vertices, and creating new finite elements by adding edges between this new vertex point and nearby vertices.

Thus, it will be seen that the '038 patent advantageously produces a three-dimensional mesh which more closely follows the natural shape and contour of the body, and is fully three-dimensional. However, it would be desirable to decrease the total number of finite elements making up a mesh representation of a body, while maintaining the advantages of the method of the '038 patent.

SUMMARY OF THE INVENTION

It is therefore an object of the invention to provide a method for producing a mesh representation of an object, the mesh having an advantageously small number of elements, while having an appearance tending to resemble that of the object being represented, and having good characteristics for efficient and accurate finite element or other calculation.

To achieve these and other objects, there is provided in accordance with the invention a method for extracting polyhedral elements of a set of elements from a tetrahedral mesh, comprising identifying groups of tetrahedra of the mesh which satisfy predetermined criteria for merging into various ones of the elements, and merging the identified groups into the elements.

In a preferred embodiment of the invention, the criteria for merging include (i) the existence of common faces between adjacent tetrahedra, and (ii) the existence of faces of adjacent tetrahedra, the faces sharing an edge in common and either being coplanar or having an angle therebetween which satisfies a predetermined condition, i.e., falls within a threshold value representing an acceptable deviation from coplanarity. The latter faces are referred to as quadrilateral pairs.

The method of the invention is thus practiced by using information regarding these criteria to determine which tetrahedra can be merged into which ones of the set of target elements. For instance, if the predetermined set of target elements includes pentahedra and hexahedra, and we start with a tetrahedral mesh, then groups of the tetrahedra of the mesh which are suitable for merging are identified based on known ways of decomposing the target elements into tetrahedra. A graph representation of the mesh is used, preferably including nodes representing regions of the mesh (i.e., tetrahedra) and edges between the nodes representing faces shared in common and quadrilateral pairs of faces.

Using search tree representations of graphs of known decompositions of the target elements, the graph of the mesh is searched to identify subsets of the graph of the mesh, which represent groups of the tetrahedra of the mesh which are suitable for merging into the target elements. By merging the tetrahedra this way, the total number of elements of the mesh is reduced, compared with the original tetrahedral mesh. Accordingly, the number of elements is advantageously reduced. Also, the threshold value representing an acceptable deviation from coplanarity is selected in terms of the application to which the mesh is to be put, such as in terms of a desired accuracy in finite element analysis. Thus, an optimal tradeoff between a reduced number of mesh elements and the overall performance of the application is realized.

The invention will be described primarily in the form of a method. The method is preferably practiced in connection with a suitable processing system, such as a graphics system having finite element analysis capability. Therefore, the invention may also be characterized as a system having suitable means, such as processing means, program storage means, display means, etc., for performing the method described. Also, the invention may be characterized as an article of manufacture. More specifically, the invention may be embodied in an article of manufacture, i.e., a computer program product for use with a processing system. Such an article of manufacture includes, in combination, a recording medium suitable for use with the processing system, such as a floppy disk, and program means, i.e., instructions, recorded on the medium, for directing the processing system to execute the method described.

BRIEF DESCRIPTION OF THE DRAWINGS

FIGS. 13 and 15 are search trees based on the graph of FIG. 10.

FIGS. 14 and 16 are search programs, based on the search trees of FIGS. 13 and 15, which illustrate how a graph is searched to locate groups of tetrahedra which are suitable for merging into the element represented by the graph of FIG. 10.

FIG. 17 is a pseudocode implementation of a meshing method including the method according to the invention.

DESCRIPTION OF THE PREFERRED EMBODIMENTS

Figure 1:
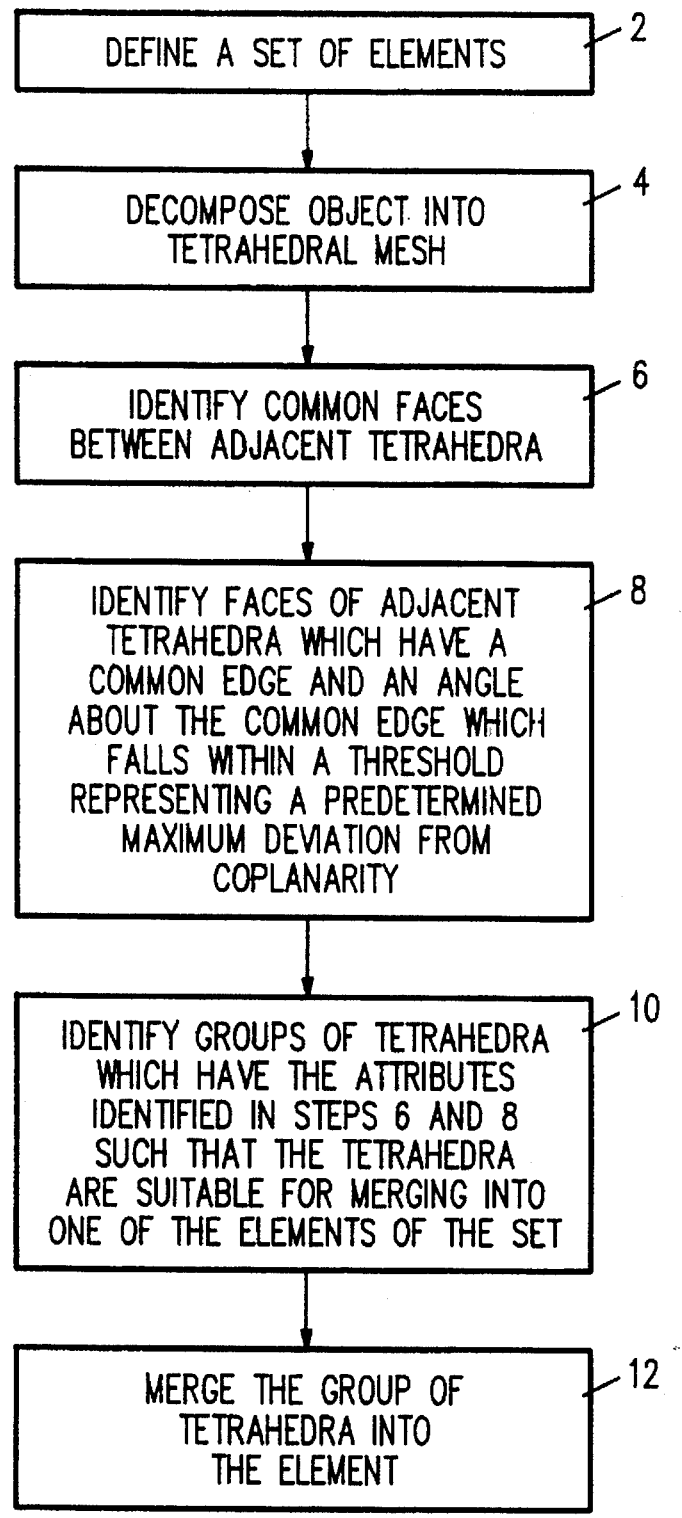
FIG. 1 is a flowchart of the method of the invention.

FIG. 1 is a flowchart showing the method of the invention, and the environment in which it is to be practiced. Steps 6, 8, 10, and 12 specifically relate to the invention, and the remainder of the flowchart provide an overall description of a method for generating a mesh representation of an object, the overall method incorporating the method of the invention.

Step 2 includes initially defining a set of elements of fixed topology. These elements are the target elements into which tetrahedra from the initial tetrahedral mesh will be merged. The set of elements preferably includes various types of polyhedra, such as pentahedra, hexahedra, etc.

In the discussion which follows, colloquialisms will be used to refer to some of these elements. A tetrahedron, the simplest three-dimensional element, has four triangular sides. A hexahedron, having six quadrilateral faces, will be called a "brick." Pentahedra can have either one quadrilateral and four triangular faces, or three quadrilateral and two triangular faces. The former will be called "pyramids", and the latter will be called "wedges."

As will be discussed in detail below, the definitions of the elements include, for each element, definitions of ways in which the element is decomposed into tetrahedra. The number of tetrahedra into which a given element is decomposed, and the number of different ways of decomposing a given element into tetrahedra, depend on the element. For certain preferred elements used in the method of the invention, details relating to decomposition into tetrahedra will be given below.

Step 4 includes decomposing the object into a mesh, or set, of initial elements. In accordance with conventional meshing techniques such as those discussed in the Background, step 4 preferably includes decomposing the object into an initial mesh composed entirely of tetrahedra in a known manner, such as by Delaunay tetrahedrization.

The first step of the invention, identifying groups of the elements (i.e., tetrahedra) suitable for merging into target elements of the set, is practiced as follows: First, the mesh of tetrahedra is analyzed to identify characteristics of the tetrahedra, so that the tetrahedra may be merged in accordance with these characteristics.

In a preferred embodiment of the invention, the characteristics which are identified are common faces between adjacent tetrahedra (step 6), and faces between adjacent tetrahedra which have a common edge and which are either coplanar, or have an angle therebetween which satisfies a predetermined condition (step 8).

Details regarding the characteristics of step 8 will be given below. Pairs of faces of adjacent elements which satisfy the latter criterion (that of step 8) are called quadrilateral pairs, since, when the two elements are merged, the two triangular faces making up the quadrilateral pair are converted into a single quadrilateral face of the resultant element.

After the characteristics of the tetrahedra are determined by analysis, they are used to identify groups of the tetrahedra from the set which have characteristics such that the groups of tetrahedra may be merged into elements of the set (step 10). Finally, in step 12, these groups of tetrahedra are merged.

Figure 2:
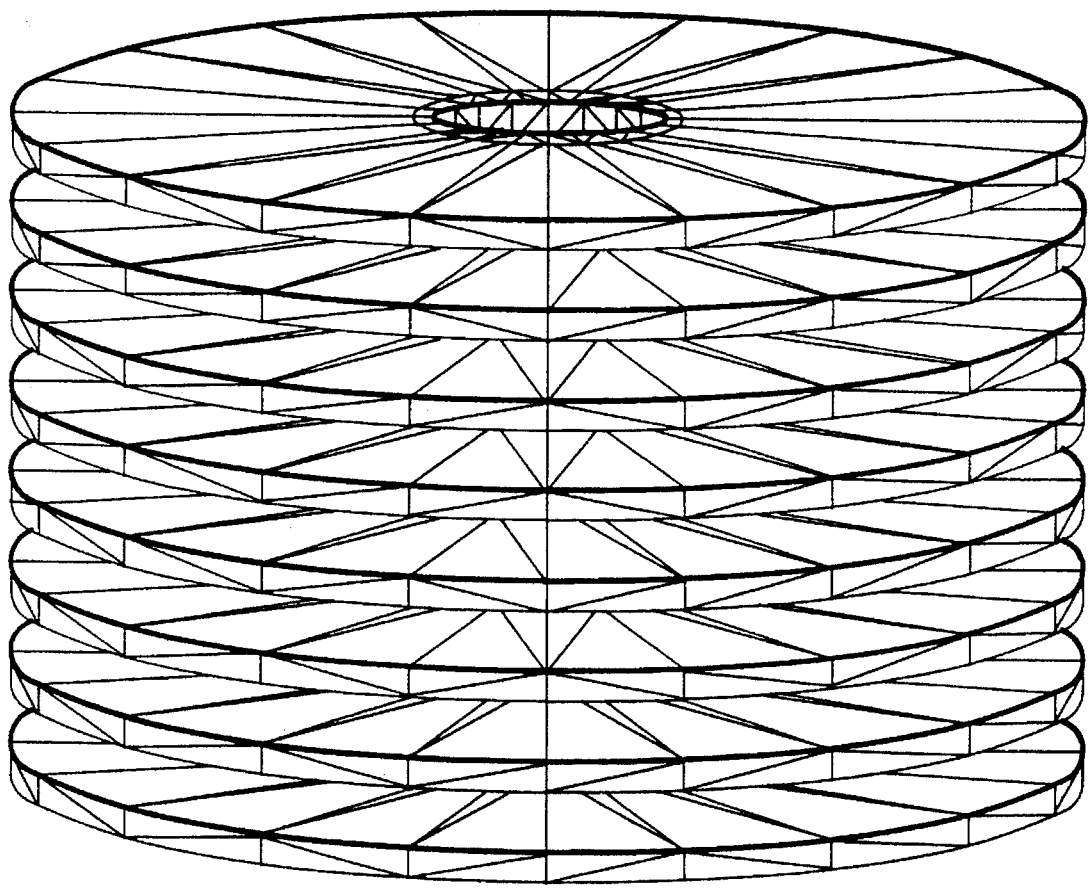
FIG. 2 is an illustration of the decomposition of an object at a stage prior to execution of the method of the invention.
Figure 3:
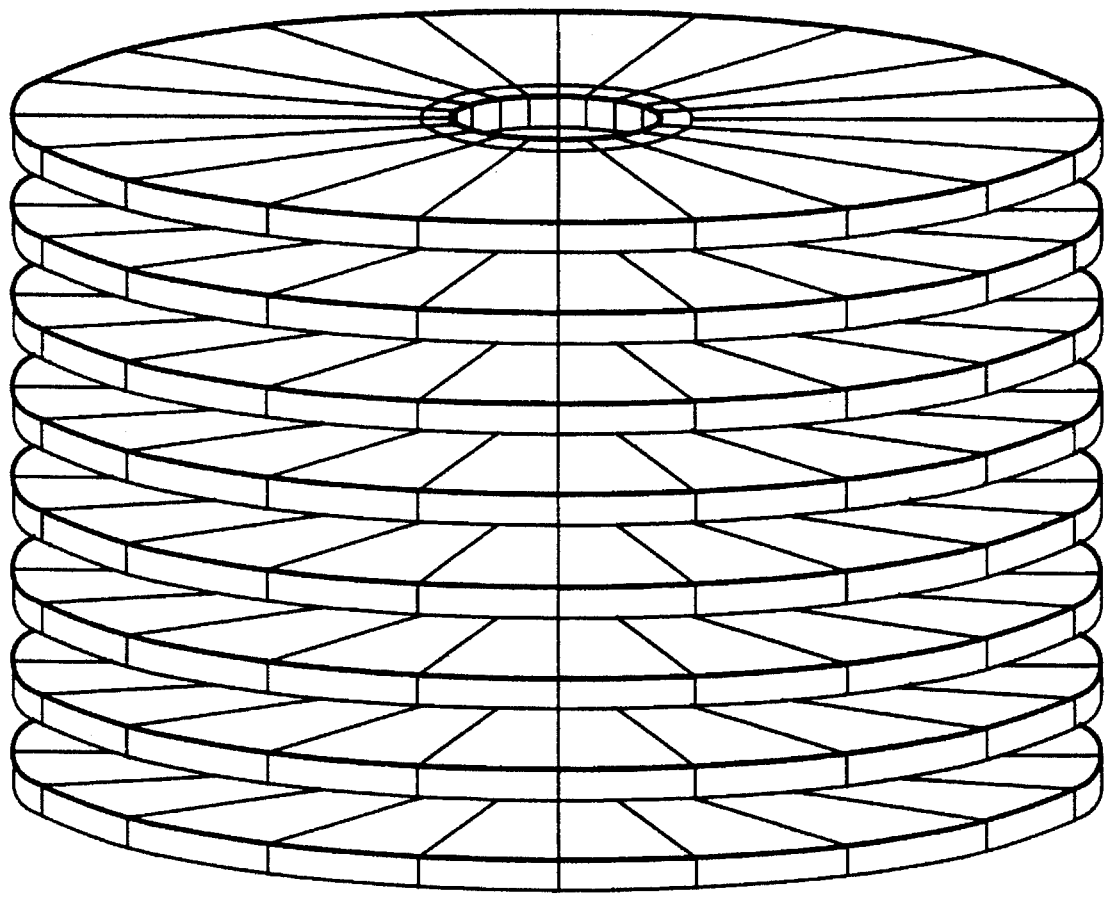
FIG. 3 is an illustration of the decomposition of an object at a stage, subsequent to that of FIG. 2, in which the method of the invention is completed.

FIGS. 2 and 3 provide an illustration of how the method of the invention operates on a graphical representation of an object. The object is a disk stack. In FIG. 2, a tetrahedral mesh for the disk stack is shown. This illustration represents the result of step 4 of the method of FIG. 1. As shown, the round, flat disks of the stack are decomposed radially into tetrahedra. The round outer perimeters of the disks are represented as polygons by the outer faces of the tetrahedra.

The remainder of the method of the invention (steps 6, 8, 10, and 12) is then practiced on the mesh shown in FIG. 2 to produce the mesh shown in FIG. 3. As shown, tetrahedra have been merged to produce hexahedra, which form pie-slice-shaped radial sections of each disk of the stack. The overall number of elements making up the mesh of FIG. 3 is reduced, relative to that of FIG. 2. However, the mesh of FIG. 3 follows the natural shape and contour of the disk pack. Thus, the method of the invention achieves the advantageous decrease in the total number of elements, while preserving the advantageous shape and contour for a fully three-dimensional object.

A preferred method for practicing steps 6, 8, and 10 of the invention will now be discussed in detail. A mesh may be represented as a graph. A three-dimensional, generalized graph for a polyhedral mesh includes information relating to vertices, edges, faces, and regions. However, a graph having all of this information is difficult to represent and to compute on. Also, it has been found that the method of the invention need not use all of this information in order to work effectively.

Therefore, in accordance with the invention, a subgraph, i.e., a graph containing a subset of the information discussed above, is used. The preferred subgraph includes two types of information, regions and faces having certain properties of interest in the merging process.

Regions are represented in the graph as vertices or nodes, and faces are represented as edges. For instance, a graph representation of a tetrahedral mesh includes a node corresponding with each of the tetrahedral regions defined by the tetrahedra of the mesh. An edge connected to a node represents a face of the tetrahedron represented by the node.

Thus, a graph of the tetrahedral mesh of FIG. 2 includes nodes corresponding with the tetrahedra, and edges connected to respective nodes to represent respective faces of the tetrahedra. Such a subgraph is relatively easy to work with, because it is planar and well-suited for representation of tetrahedral meshes. Also, information regarding edges and vertices of the tetrahedra, which are not required for effective practice of the method of the invention, are omitted from the graph representation of the mesh, thus simplifying the graph.

In addition, graphs according to a preferred embodiment of the invention include only edges which represent a subset of the faces of the tetrahedra making up the mesh. The method of the invention includes merging adjacent tetrahedra which have characteristics making them suitable for merging. As shown in steps 6 and 8, these characteristics preferably have to do with faces of the tetrahedra. Specifically, tetrahedra suitable for merging have common faces, and have faces which share a common edge and which are either coplanar or have an angle therebetween which satisfies a predetermined condition. Preferably, the condition is that the angle falls within a threshold value representing an acceptable deviation from coplanarity. Therefore, in accordance with the invention, graph representations need only show those faces of the tetrahedra which have to do with the characteristics.

The second characteristic, in which two tetrahedra have faces which share a common edge, the faces either being coplanar or having an angle therebetween which satisfies a predetermined condition, will be discussed in detail below. When the two tetrahedra are merged, the two faces are merged into a single quadrilateral face. Accordingly, the sides of the two tetrahedra are referred to as a quadrilateral pair.

Figure 4A:
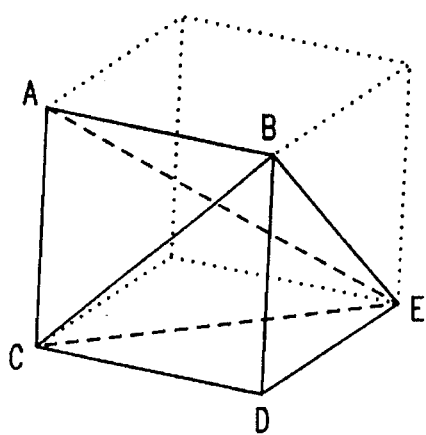
FIG. 4A is a tetrahedral mesh which is to be merged into a pentahedron by execution of a preferred embodiment of the method of the invention.
Figure 4B:
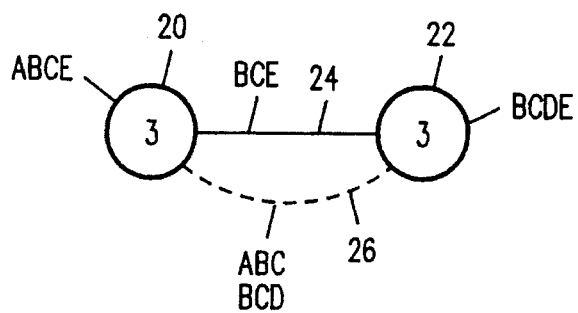
FIG. 4B is a graph representation of the mesh of FIG. 4A used in a preferred embodiment of the invention.

FIGS. 4A and 4B together show an example of a preferred graphing scheme for a tetrahedral mesh. FIG. 4A shows a mesh including two tetrahedra which are to be merged into a pentahedron, "pyramid." For ease of visualization, the mesh is shown as being enclosed within a brick-shaped region of space. The edges of the brick which are not part of the mesh are shown as dotted lines. Hidden lines of the mesh, i.e., hidden edges of the tetrahedra, are shown as dashed lines.

The vertices of the tetrahedra are labeled with letters. The two tetrahedra are ABCE and BCDE. In accordance with the invention, we are concerned primarily with common faces between adjacent tetrahedra, and common-edge faces of adjacent tetrahedra which are either coplanar or have an angle therebetween which satisfies the predetermined condition. Therefore, the subgraph according to the preferred embodiment of the invention uses two different means for representing the common faces and the quadrilateral pair faces, and omits representation of other faces. In FIG. 4A, the common face between the two tetrahedra is BCE, and the faces making up the quadrilateral pair are ABC and BCD, the common edge being BC.

FIG. 4B is a graph representation of the mesh of FIG. 4A. The two tetrahedra ABCE and BCDE are represented, respectively, by nodes 20 and 22. The nodes 20 and 22 optionally contain numbers representing the number of external faces of the tetrahedra they represent. In the case of FIG. 4A, each of the tetrahedra have three external faces. The external faces of the tetrahedra ABCE (node 20) are ABC, ABE, and ACE. The external faces of the tetrahedron BCDE (node 22) are BCD, BDE, and CDE. The internal face BCE shared in common between the two tetrahedra is represented by a solid line 24 between the two nodes 20 and 22. The quadrilateral pair of faces ABC and BCD are represented by a dotted line 26. When the two tetrahedra ABCE and BCDE are merged into the pyramid ABCDE in step 12, the common face BCE is extinguished, and the quadrilateral pair faces ABC and BCD are combined to produce a quadrilateral face ABCD of the resultant pyramid.

Elements other than pyramids, decomposed into a mesh of tetrahedra, may also be represented by graphs in the same manner. There is one way of decomposing a triangular prism, or "wedge," into tetrahedra, shown in FIG. 5A. In terms of the graphing scheme described above, this mesh of tetrahedra is represented by the graph shown in FIG. 5B.

Figure 5A:
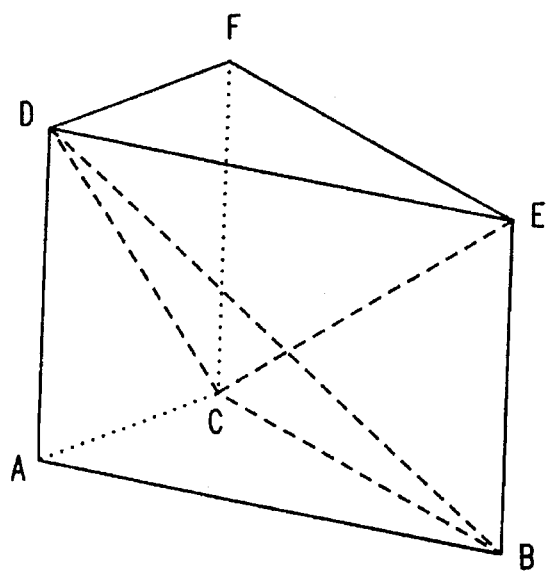
FIG. 5A is a tetrahedral mesh which is to be merged into a triangular prism by execution of a preferred embodiment of the method of the invention.

FIG. 5A shows a wedge ABCDEF decomposed into three tetrahedra, ABCD, BCDE, and CDEF. In the graph representation of FIG. 5B, these three tetrahedra are shown as nodes 28, 30, and 32.

Figure 5B:
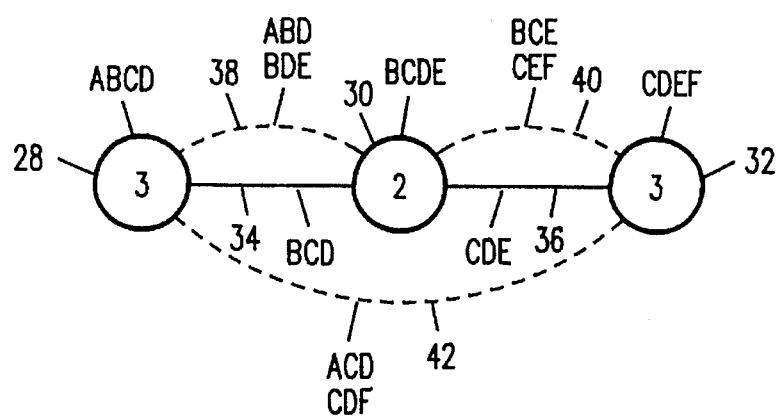
FIG. 5B is a graph representation of the mesh of FIG. 5A used in a preferred embodiment of the invention.

The tetrahedra ABCD and BCDE share the face BCD in common. Thus, a solid line 34 in FIG. 5B represents the face BCD. The tetrahedra BCDE and CDEF share the face CDE in common. Thus, a solid line 36 in FIG. 5B represents the face CDE. The faces ABD and BDE of the tetrahedra ABCD and BCDE form a quadrilateral pair, and are represented by a dashed line 38 between the nodes 28 and 30 in FIG. 5B. The faces BCE and CEF of the tetrahedra BCDE and CDEF form a quadrilateral pair, and are represented by a dashed line 40 between the nodes 30 and 32 in FIG. 5B. The faces ACD and CDF of the tetrahedra ABCD and CDEF form a quadrilateral pair, and are represented by a dashed line 42 between the nodes 28 and 32 in FIG. 5B. Therefore, FIG. 5B is a graph representation of the mesh of FIG. 5A, in accordance with the preferred graphing scheme.

Figure 6:
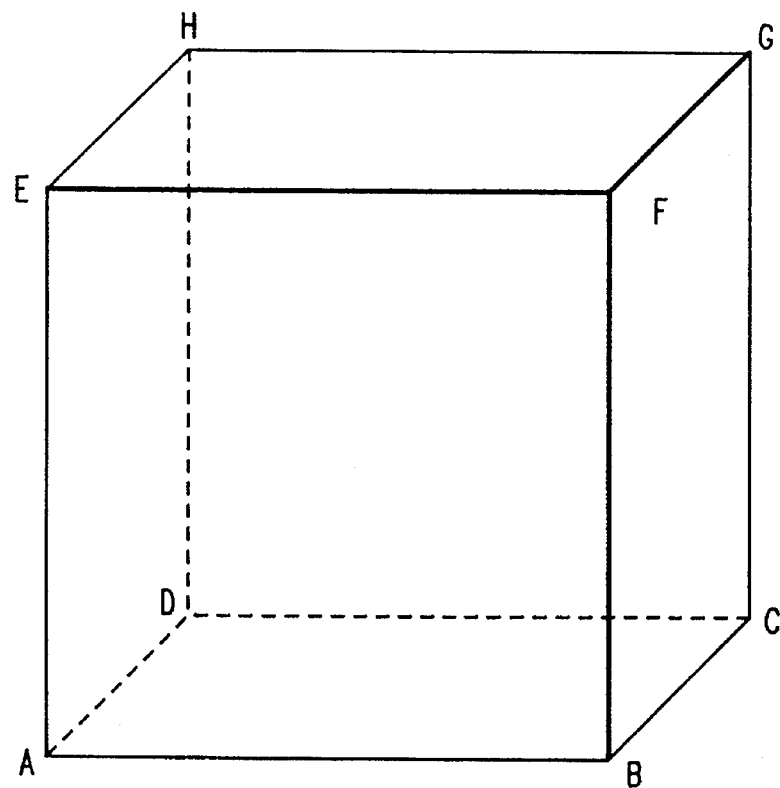
FIG. 6 is a hexahedron, having labeled vertices, for illustration of different tetrahedral meshes which can be merged into a hexahedron by performance of the method of the invention.

The various ways in which other elements may be decomposed into tetrahedra may be graphed in a similar fashion. A hexahedron, such as ABCDEFGH in FIG. 6, can be decomposed into five tetrahedra one way (FIG. 7), or into six tetrahedra five ways (FIGS. 8 through 12). The nodes shown in FIGS. 7 through 12 are labeled with the appropriate vertices from the hexahedron of FIG. 6, so that the different groups of tetrahedra corresponding with the graphs may be visualized. Again, the number of external faces of each tetrahedron is given inside the corresponding node. Common faces between two adjacent tetrahedra may be easily identified, since three out of the four vertices of the two tetrahedra match.

Also, additional information is provided in FIGS. 7 through 12. First, since the dashed lines represent a quadrilateral pair, the dashed lines are identified with the two vertices of the edge shared in common between the quadrilateral pair of faces. For instance, in FIG. 7, the tetrahedra BEFG and BCDG share the common edge BG. Therefore, the dashed line between the nodes BEFG and BCDG is labeled BG. It might be noted at this point that two tetrahedra which share a common triangular face have three edges in common, by definition. However, at most one of the common edges can be part of a quadrilateral pair. Therefore, it cannot be told from the vertices alone which two of the three common vertices are the endpoints of the common edge of the quadrilateral pair. Rather, a visualization of the two tetrahedra, with the use of FIG. 6, must be made to determine which faces form the quadrilateral pair. The dashed lines of the graph denote only those edges whose adjacent faces meet the criteria of being coplanar or having an angle therebetween which satisfies the predetermined condition.

Other elements, such as pentahedral prisms, etc., may also be represented graphically in the same manner. However, for finite element analysis applications, it is preferred that the set of predetermined elements include pentahedra (either wedges or pyramids) and bricks. For the sake of brevity, details of tetrahedral representations of other elements will be omitted. It is believed, however, that given the foregoing examples, a person of ordinary skill in the art would be able to visualize the decomposition of other elements into tetrahedra, and to apply the same principles as those described above to generate graphs of the decomposition of these elements.

Also, symmetrically distinct tetrahedra are represented, in the graph, by nodes with arrows. Each symmetrically distinct tetrahedron has a topological relationship to the other tetrahedra of the group which is different from the topological relationships of any other tetrahedra also represented by nodes illustrated with arrows. On the other hand, each tetrahedron which is represented by a node not illustrated with an arrow has a topological relationship with the other tetrahedra of the group which is the same as that of one of the tetrahedra represented by nodes which are illustrated with arrows. Given the solid and dashed line representations of common faces and quadrilateral pairs, and the numbers of external faces inside the nodes, it is possible to tell by inspection which of the nodes represent tetrahedra having the same topological relationship to the others of the group. In such instances, one of the tetrahedra having the same topological relationship is marked with an arrow, and the rest are not.

Figure 7:
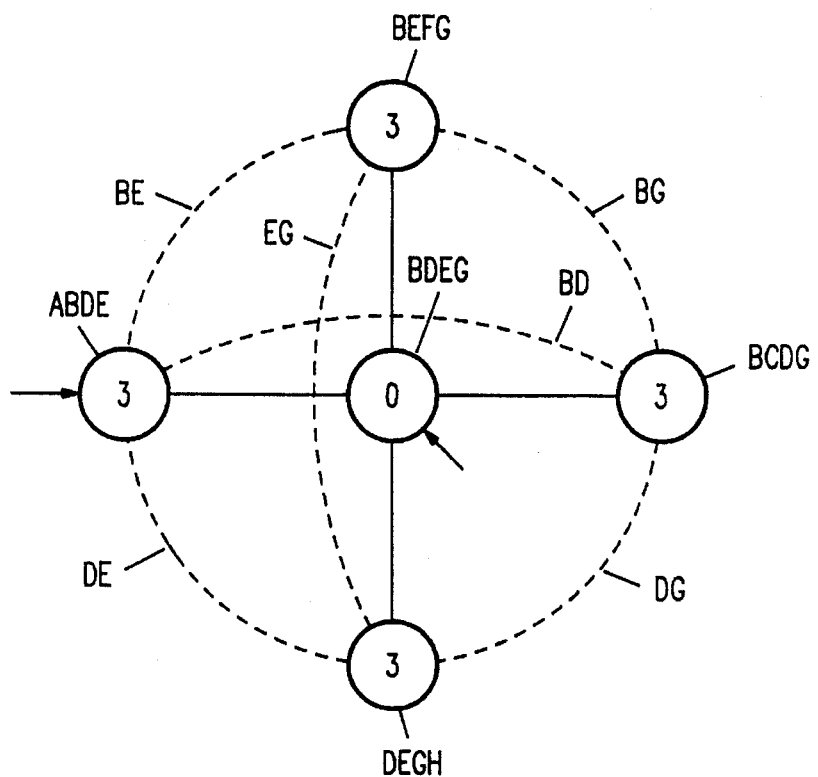
FIGS. 7, 8, 9, 10, 11, and 12 are graph representations of various tetrehedral meshes which can be merged into the hexahedron of FIG. 6 by performance of the method of the invention.
Figure 8:
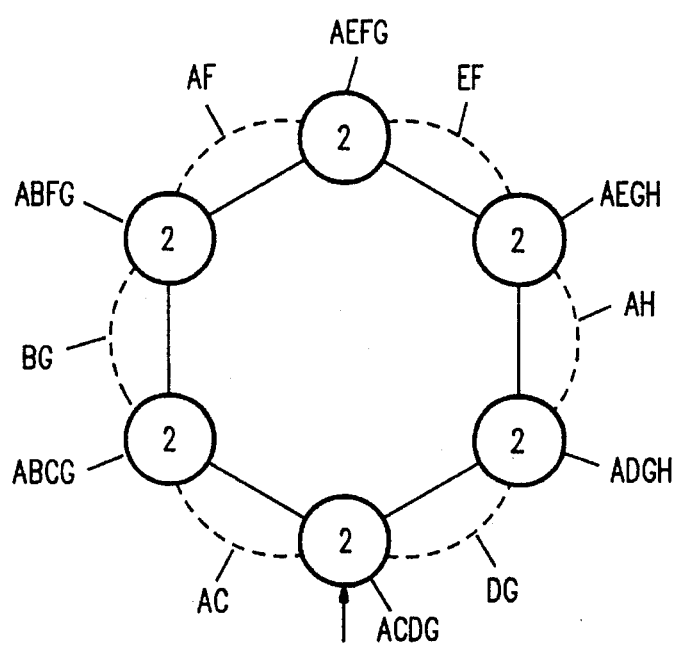
Figure 9:
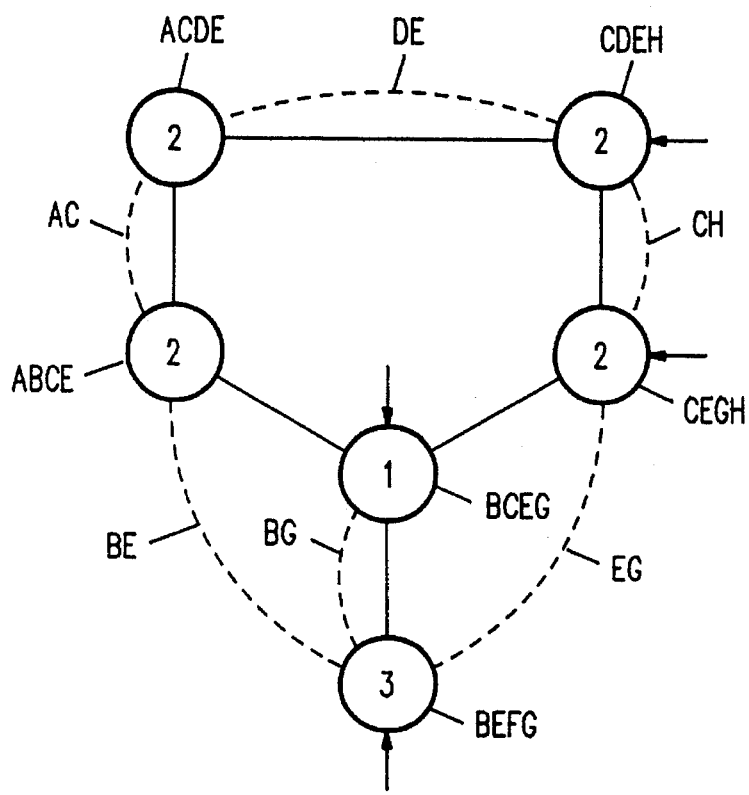
Figure 10:
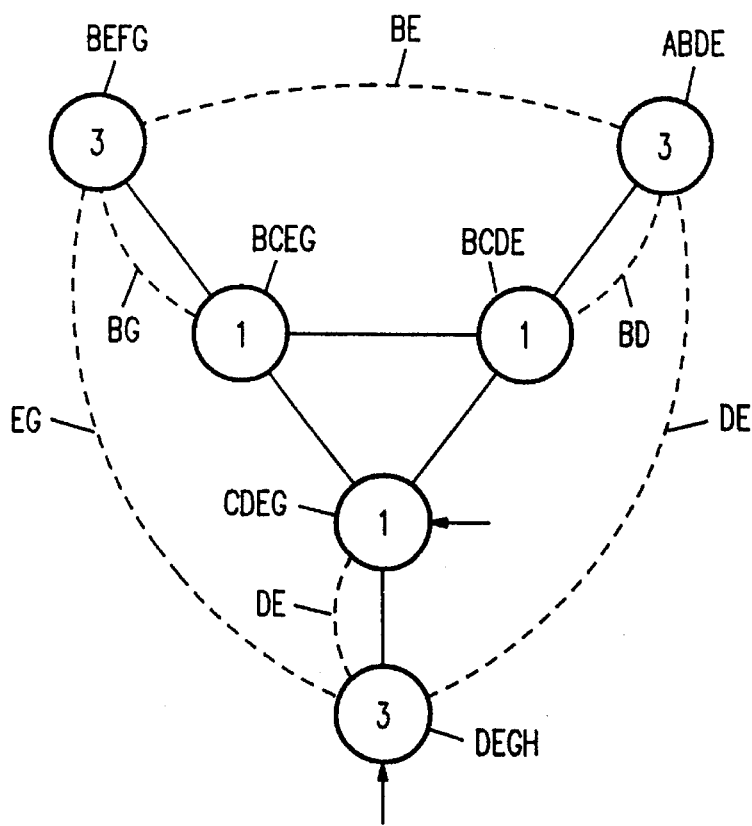
Figure 11:
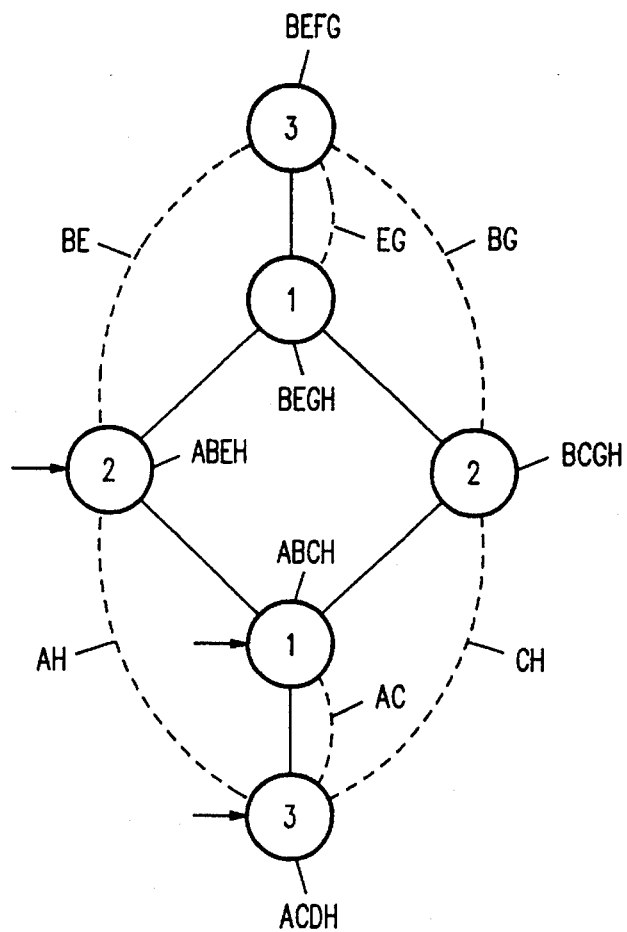
Figure 12:
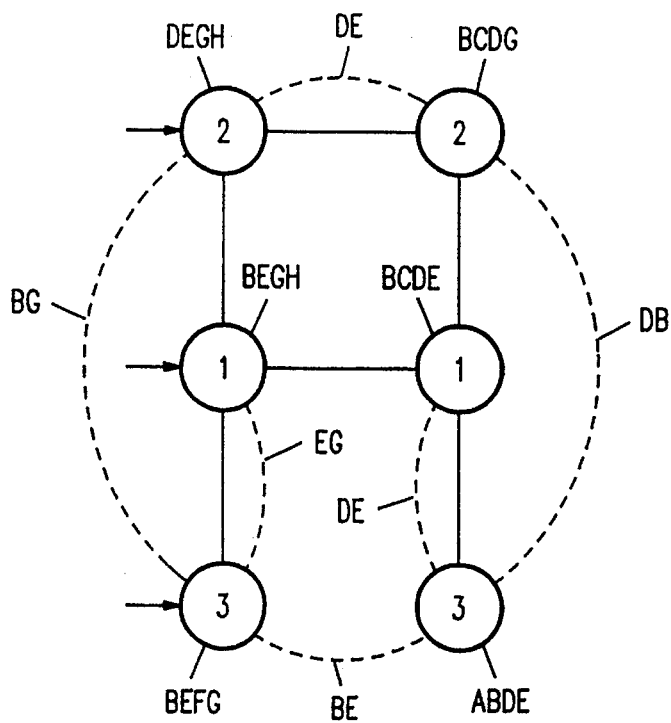

For example, in FIG. 8, only the node ACDG has an arrow, because all five of the other nodes are symmetrically equivalent. In FIG. 10, there are two groups of three symmetrically equivalent nodes. The first group includes the outer nodes BEFG, ABDE, and DEGH. The second group includes the inner nodes BCEG, BCDE, and CDEG. Thus one node from each group has an arrow. In FIG. 7, the four outer nodes ABDE, BEFG, BCDG, and DEGH are all symmetrically equivalent, so only the node ABDE (selected arbitrarily) has an arrow. The node BDEG in the center is not symmetrically equivalent to any of the other nodes. However, the node BDEG does not have an arrow. It would normally be entitled to an arrow by virtue of being symmetrically distinct from the other nodes. The node BDEG has no external faces, as indicated by the number "0" inside it, and by the four solid lines connected to it, indicating that all four of its faces are in common with faces of other tetrahedra of the group.

The nodes with arrows are utilized in searching a graph representation of a mesh of an object for groups of elements which can be merged, in a manner which will be described in detail below. The reason for the absence of an arrow has to do with the preferred searching technique.

In summary, steps 6 and 8 of the flowchart of FIG. 1 are executed for a mesh such as the tetrahedral mesh of FIG. 2, preferably to produce a region-face representation such as the graphs discussed above. Given this information, step 10 is executed by locating sections of the graph of the tetrahedral mesh which match a graph representation of a tetrahedral decomposition of a target element, such as those illustrated and discussed above. The tetrahedra are then merged into the target element, thereby reducing the total number of elements of the mesh. For example, if five tetrahedra of a tetrahedral mesh are merged into a brick, as per FIG. 7, then the total number of elements of the mesh has been reduced by four.

A more detailed description of a preferred method for finding groups of tetrahedra suitable for merging will now be given. The objective is to find subsets of the graph of the tetrahedral mesh which match the graph representations of the target elements into which tetrahedra are to be merged, such as those in FIGS. 4B, 5B, and 7–12.

The preferred way of finding such subsets includes constructing search trees. Each node of the graph can be a root of a search tree. However, in some cases, different nodes of a graph may represent symmetrically equivalent tetrahedra. In such cases, the construction of search trees using the different nodes as roots will result in redundant trees. Therefore, in accordance with another aspect of the invention, identifiers are included in graphs to point out symmetrically distinct nodes. In the case of FIGS. 7–12, the arrows, previously discussed, are used to point out the symmetrically distinct nodes. For instance, the graph of FIG. 8 has a high degree of symmetry, so only the node ACDG has an arrow. The other five nodes are symmetrically equivalent. Therefore only one search tree need be constructed for the graph of FIG. 8.

As an example, assume that a tetrahedral mesh of a brick, decomposed as per FIG. 10, is to be analyzed. There are two symmetrically distinct nodes, DEGH and CDEG, which are identified with arrows. The remaining nodes are symmetrically equivalent to one or the other of these two nodes. Therefore, two search trees are created for the graph of FIG. 10.

Figure 13:
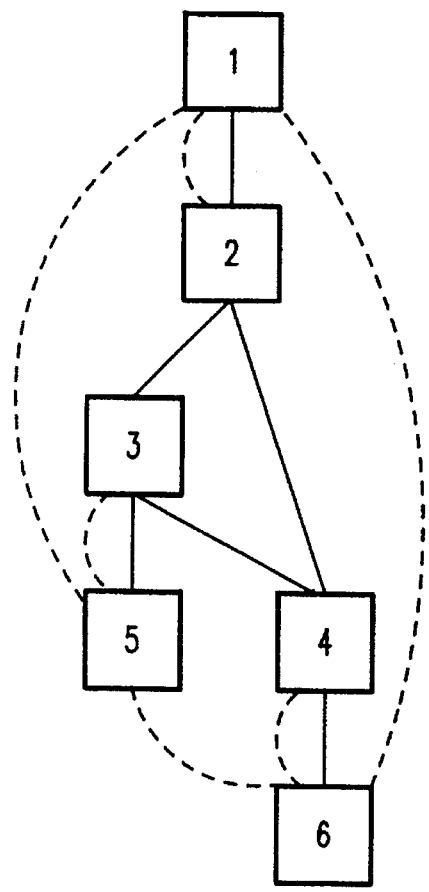
Figure 14:
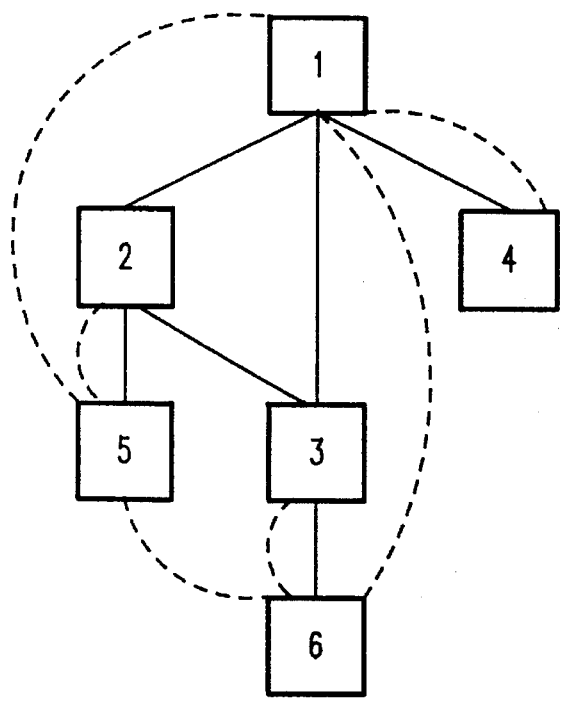

The two search trees are shown in FIGS. 13 and 14. Nodes are represented as squares, and are connected with solid and dashed lines to represent common faces and quadrilateral pairs, respectively, in the same manner as FIG. 10. The nodes are numbered with sequence numbers.

Given the search trees as shown, a program is executed to identify groups of elements suitable for merging. In a preferred embodiment, the program is implemented as having two operations, LINK and QUAD. The LINK operation has two arguments, and is given in the form LINK a,b. The LINK operation starts a search from a tetrahedron assigned to node "a" for a tetrahedron to assign to the node "b" of the graph. Whether the LINK operation succeeds or fails is determined by whether there exists, in the mesh, another tetrahedron having an appropriate face in common with the previously designated a tetrahedron. The QUAD operation has two arguments, and is given in the form QUAD a,b. The QUAD operation verifies that the tetrahedra already assigned to nodes "a" and "b" of the search tree have a valid quadrilateral pair. The QUAD operation succeeds or fails based on whether this is the case. If either a LINK operation or a QUAD operation fails, then a backtrack through the search tree to an earlier, successful LINK is performed. If all possible assignments have failed for a LINK, or there is no earlier LINK statement, then the search fails for that particular search tree. Thus, the LINK and QUAD commands may be thought of as corresponding to the solid and dashed lines, respectively, of a search tree.

FIGS. 15 and 16 show programs corresponding with the search trees of FIGS. 13 and 14, respectively. Execution of these programs may be understood as follows. As each face of the tetrahedral mesh is assigned to a LINK or a QUAD, it becomes unavailable for further assignment. As each backtrack takes place, the assigned faces become available for other assignments. If the search program is executed to completion, then the search is successful, and a group of tetrahedra which are suitable for merging into the element represented by the search tree has been identified.

While the foregoing description provides a graph theoretical criterion for identifying tetrahedra in a mesh which are suitable for merging into desired target elements, the user may have other criteria which dictate that certain tetrahedra of a mesh should or should not be considered suitable for merging. For instance, in a tetrahedral mesh representing an object having different components, or sections made of different materials, it would be inappropriate to merge tetrahedra from the different components or sections. To accommodate this contingency, appropriate coding may be made for the tetrahedra representing the different components or sections. Then, the merging process additionally includes checking the coding, to be sure that tetrahedra with incompatible codes are not merged. For example, in the mesh of FIGS. 2 and 3, representing a disk pack, each disk includes an inner portion for mechanically interfacing with a disk drive, and an outer portion which actually carries the stored information for access by disk drive heads. Therefore, the tetrahedra in the mesh of FIG. 2 are coded to distinguish these two portions. After the merging process, the resultant mesh (FIG. 3) still shows the inner and outer portions as separate sets of elements.

Another consideration relating to whether tetrahedra are suitable for merging has to do with quadrilateral pair faces. Meshing is typically used in connection with finite element analysis. In such applications, accuracy of numerical results requires that the total distortion from planarity of the quadrilateral face or faces of a merged polyhedron be controlled.

As described above, two faces of two adjacent tetrahedra which share a common edge are suitable for merging if either (i) they are coplanar, or (ii) an angle between the planes of the faces satisfies a predetermined condition, i.e., falls within a threshold value representing an acceptable deviation from coplanarity. Ideally, to eliminate or minimize distortion, the faces of a quadrilateral pair should be coplanar, i.e., the faces should be 180° opposite each other from the common edge. However, an angle between the faces of the quadrilateral pair less than 180° need not preclude merging the tetrahedra, as long as the resultant distortion is not so great as to exceed the limits on distortion required by the application. That is, the threshold is an angle, less than 180°, which is a minimum acceptable angle between faces which are to be merged into a single face.

In a preferred mode for practicing the invention, two parameters are used for measuring the distortion which accrues for a given merger of elements of a mesh. In finite element analysis applications, this accrued distortion relates to the inaccuracy which will appear in a finite element analysis of the elements of a mesh, if a given group of elements of the mesh merged. The two parameters are defined and discussed below. The first of the two parameters relates to the distortion, discussed above, from merger of a non-coplanar quadrilateral pair.

Values for the two parameters are set, and then applied overall to the mesh as the method of the invention is practiced. For the sake of comprehension, however, in the discussion which follows, the two parameters will be described with respect to a single pair of elements to be merged.

The first parameter is called the Minimum Acceptable Dihedral Angle, or "dangle." The dangle is the angle, about the common edge, between the planes of the two faces making up the quadrilateral pair.

In the ideal case, in which the two faces are coplanar, the dangle 180°. If the faces are not coplanar, then the angle about the common edge may be measured on an interior side of the faces, in which the angle is less than 180°, or on an exterior side of the faces, in which the angle is greater than 180°. It will be seen that these two angles add up to 360°, regardless of the angle between the faces. As a consequence, either of these two angles may be measured, and the magnitude of the difference between the measured angle and 180° used to measure the amount of distortion resulting from merging the faces.

In the preferred mode for practicing the invention, the angle measured on the interior side of the faces, the "dangle," is used to measure the distortion of the quadrilateral face resulting from the merger. Thus, 180° is an upper bound on the dangle, and represents zero (or a minimal amount of) distortion. A dangle less than 180° represents a finite amount of distortion of the face created by merging the quadrilateral pair. As the dangle drops further below 180°, the distortion increases. A dangle less than 180° is set based on the required accuracy of the finite element analysis, so that the maximum possible distortion still keeps the result of the finite element analysis sufficiently accurate. Thus, a range of acceptable face angles is defined. If, as in the preferred mode, the dangle is set less than 180°, then the range runs from the dangle up to 180°.

The second parameter is called the Maximum Acceptable Face Angle, or "fangle." The fangle is the largest permissible angle between two adjacent edges of the quadrilateral face.

If two coplanar triangular faces ABC and BCD, having a common edge BC, are to be merged into a quadrilateral ABDC, then the angles BAC and BDC of the respective triangles become two of the angles of the resultant quadrilateral. The other two angles of the quadrilateral are (i) the sum of the angles ABC and DBC, and (ii) the sum of the angles ACB and DCB.

It is well known that the angles at the four vertices of a quadrilateral add up to 360°. In the case of squares and rectangles, all four of the angles are 90°. Thus, 90° is a lower bound on the value of the fangle. Other types of quadrilaterals, such as parallelograms, trapezoids, etc., have angles which vary above and below 90°. Since the fangle is the maximum angle, in these other cases, the value of the fangle exceeds 90°.

Of course, in an alternative embodiment of the invention, the second parameter could be a minimum acceptable face angle. Since the sum of the angles at the four vertices of a quadrilateral is a constant, if the maximum angle is greater than the average, then the minimum angle must be lesser. Thus, either a maximum or a minimum acceptable face angle could be used to indicate a degree of deviation of the quadrilateral face from a square or triangle. Which, if either, of these alternatives is preferable depends on the particular application to which the mesh is to be put. For the present preferred mode for practicing the invention, the Maximum Acceptable Face Angle, which is lower-bounded by 90° for quadrilateral faces, is used.

Referring back to the merger of the coplanar faces ABC and BCD discussed above, if the resultant quadrilateral ABDC is a square or rectangle, then finite element calculations for a region including ABDC as one face are relatively accurate. If, on the other hand, the four angles of ABDC vary greatly above and below 90°, then the face ABDC, and the polyhedral region overall, is diagonally "stretched." As a consequence, finite element calculations have decreased accuracy. Therefore, the lesser the extent by which the fangle exceeds 90°, the less the distortion, although for many applications the distortion does not become unacceptably high until the fangle is well in excess of 135°, or approaches the theoretical upper bound of 180°.

The dangle and the fangle may be varied by the user, depending on the desired results. The more closely the dangle and the fangle conform to their optimal values, 180° and 90°, respectively, the better the shapes which result. For example, the mesh representation of the disk stack in FIG. 3 was produced from the tetrahedral mesh of FIG. 2 by the method of the invention using a fangle of 120° and a dangle of 179°. On the other hand, as the values of the dangle and fangle relax, i.e., are allowed to vary from their ideal values, the probability of successfully finding groups of tetrahedra suitable for merging increases. As a consequence, the total number of elements resulting from the practice of the method of the invention advantageously decreases.

When the method of the invention is practiced, using the above-described search trees, to identify groups of tetrahedra suitable for merging, their suitability is preferably determined in terms of the parameters just described. It is possible to have several polyhedra with different search trees indicent to a given starting tetrahedron. For this reason, the method of the invention is preferably practiced by finding all such polyhedra, and selecting one with the least amount of total distortion resulting from merging tetrahedra with non-ideal dangle and fangle values.

In addition to the criteria discussed above, the method of the invention also preferably employs a volume-to-area ratio as a general shape measure. The preferred volume-to-area ratio is a non-dimensional value given by the formula $$var = \frac{V^2}{36\pi A^3},$$

where V and A are the volume and total surface area of the polyhedron. The ratio is preferably normalized to give positive values less than 1.

The overall method for merging tetrahedra of a mesh representation of an arbitrary object is thus practiced by taking the original graph representation of the tetrahedral mesh and replacing recognized subgraphs of it by single nodes representing the target elements, i.e., hexahedral or pentahedral nodes. In general, the resultant graph is not unique. Also, the user has a choice of global objective functions by which to choose between two identified transformations.

The optimal global objective function is largely application-dependent, but the following components are likely to merit consideration: First, the final number of elements should be as small as possible. Second, the average distortion of the elements should be as small as possible.

Third, the number of QT connections should be kept to a minimum. A QT connection, or "quadrilateral-triangle" connection, is defined as a quadrilateral face of an element, produced by merging two or more tetrahedra, which abuts two triangular faces of two different elements. That is, if any interior face of a merged element of the mesh has four (or more) sides, then it is preferable that the method of the invention should have merged the tetrahedra on both sides of the face to produce two elements which share a quadrilateral face in common.

To achieve optimal results, the following strategies have been used: First, the search is begun at a boundary of the mesh, and boundary quadrilaterals are sought initially. Second, in an attempt to be "greedy," where a local area within the graph offers choices that affect the objectives, such as different ways of merging groups of tetrahedra which result in different reductions of the total number of elements, the local best choice is selected. Third, where a local area within the graph offers choices that do not locally affect the objective, pick one at random.

Fourth, a breadth-first search is performed. Two types of searches may be defined, and named, in terms of the topology of the search trees, such as those of FIGS. 13 and 14. Given a search tree, one strategy is to start at the root, go all the way down one branch, backtrack up to a junction with a second branch, go all the way down the second branch, back to a third branch, go all the way down the third branch, etc. This strategy is called a "depth-first" search. A second strategy is to go a given (short) distance down each branch, go a given additional distance down each branch, go another given additional distance down each branch, etc. In terms of a mesh, or graph of a mesh, this second strategy is practiced by starting at a node, checking all immediate neighbors of the node, checking all immediate neighbors of the first group of immediate neighbors, etc. This second strategy is called a "breadth-first" search.

It was stated earlier that, in FIG. 7, the node BDEG did not have an arrow, even though it was symmetrically distinct from the other nodes. Following the discussion of search trees just given, it will now be explained in more detail why, in this particular case, a symmetrically distinct node did not receive an arrow. The arrows identify the nodes which form the roots of search trees. As stated above, in two search strategies, breadth-first and depth-first, a node is selected as a root, and the search moves through the mesh from there, looking for other nodes which, together with the root, match the search tree. These strategies are better suited for finding groups of nodes, the root of which being on an outer boundary of the group. The node BDEG in FIG. 7 is entirely enclosed within the other nodes. That is, all of the faces of the node are in common with other nodes of the group. As a consequence, a node of a mesh being operated upon by the method of the invention, which is selected as a root node corresponding to the node BDEG, is unlikely to have four other nodes connected by the same pattern of faces as defined in FIG. 7. Or, if there are such nodes, the preferred "breadth-first" or the "depth-first" methods are relatively unlikely to identify such a group of nodes. Therefore, even though the node BDEG is symmetrically unique in the graph of FIG. 7, it will not be treated as a root node, and is not assigned an arrow.

The method of the invention has been implemented using the C++ object-oriented language. C++ classes were created to represent the RF-graphs, graph edges of both LINK and QUAD type, graph nodes, and the state of their assignments.

FIG. 17 is a pseudocode implementation of the method according to the invention. Using the programs of FIGS. 14 and 16 for the search trees of FIGS. 13 and 15, which represent the graph of FIG. 10 as examples, the pseudocode of FIG. 17 may be followed through to see how a given graph for a given target element may be located within a graph of a mesh representation of an arbitrary object.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A finite element modeling method for determining a physical attribute of an object using a mesh representation of the object the mesh including elements from a predetermined set of first and second elements, the method comprising the steps of:

decomposing the object into a mesh including a set of tetrahedra;

identifying a group of first elements of the mesh as being suitable for merging into a second element from the predetermined set;

merging the identified group of first elements into the second element from the predetermined set;

displaying a representation of the physical attribute of the object based on the mesh representation of the object produced by the steps of decomposing, identifying, and merging; and representing the tetrahedra produced in the step of decomposing in the form of a graph which shows (i) nodes representing the tetrahedra, (ii) first node connectors representing faces shared in common between pairs of the tetrahedra, and (iii) second node connectors representing two faces, each face being of different tetrahedra which have an edge in common and have an angle therebetween which satisfies a predetermined condition.

2. A method as recited in claim 1, wherein:

the elements of the predetermined set are represented as a set of respective subgraphs representing groups of tetrahedra which may be merged into respective ones of the elements of the predetermined set;

the step of identifying includes finding a portion of the graph, the portion matching one of the respective subgraphs, and representing a group of the tetrahedra produced in the step of decomposing, which matches one of the respective subgraphs; and the step of merging includes merging the group of tetrahedra represented by the portion into the respective element.

3. A method as recited in claim 2, wherein:

the elements of the predetermined set are represented as a set of respective search trees representing arrangements of the nodes of the respective subgraphs into (i) a root node corresponding with a first node of the subgraph representation of the element, and (ii) other nodes corresponding with other nodes of the subgraph and having node connectors which correspond with a first and second node connector of the respective subgraphs; and the step of identifying includes finding a portion of the graph, the portion matching one of the set of search trees.

4. A method as recited in claim 3, wherein the step of identifying includes:

selecting an initial node of the graph as corresponding to a root node of the search tree;

searching for a first group of other nodes of the graph which have connectors to at least one initial node and which have connectors to one other node of the first group, each connector corresponding with a connector between nodes of the search tree; and determining that the first group of nodes of the graph which, together, correspond with the nodes of the search tree and have corresponding connectors which correspond with a second group of elements of the mesh which are suitable for merging into one of the predetermined set of elements.

5. A finite element modeling and processing system for determining a physical attribute of an object using a mesh representation of the object, the mesh including elements from a predetermined set of elements, the system comprising:

means for decomposing the object into a mesh including a set of tetrahedra;

means for identifying a group of first elements of the mesh as being suitable for merging into an element from the predetermined set;

means for merging the identified group of first elements into the element from the predetermined set;

means for displaying a representation of the physical attribute of the object based on the mesh representation of the object produced by the means for decomposing, identifying, and merging; and means for representing the tetrahedra produced in the step of decomposing in the form of a graph which shows (i) nodes representing the tetrahedra, (ii) first node connectors representing faces shared in common between pairs of the tetrahedra, and (iii) second node connectors representing two faces, each face being of different tetrahedra which have an edge in common and have an angle therebetween which satisfies a predetermined condition.

6. A system as recited in claim 5, wherein:

the elements of the predetermined set are represented as a set of respective subgraphs representing groups of tetrahedra which may be merged into respective ones of the elements of the predetermined set;

the means for identifying includes means for finding a portion of the graph, the portion matching one of the respective subgraphs, and representing a group of the tetrahedra produced in the step of decomposing which matches one of the respective subgraphs; and the means for merging includes means for merging the group of tetrahedra represented by the portion into the respective element.

7. A system as recited in claim 6, wherein:

the elements of the predetermined set are represented as a set of respective search trees representing arrangements of the nodes of the respective subgraphs into (i) a root node corresponding with a first node of the subgraph representation of the element, and (ii) other nodes corresponding with other nodes of the subgraph and having node connectors which correspond with a first and second node connector of the respective subgraphs; and the means for identifying includes means for finding a portion of the graph, the portion matching one of the sets of search trees.

8. A system as recited in claim 7, wherein the means for identifying includes:

means for selecting an initial node of the graph as corresponding to a root node of the search tree;

means for searching for a first group of nodes of the graph which have connectors to at least one initial node and which have connectors to at least one other node of the group of nodes, each connector corresponding with a connector between nodes of the search tree; and means for determining that the group of nodes of the graph correspond with a group of elements of the mesh which are suitable for merging into one of the second elements of the predetermined set of elements, wherein the group of nodes of the graph, taken together, correspond with nodes of the search tree and have corresponding connectors.

9. A computer program product, for use with a finite element modeling and processing system for determining a physical attribute of an object using a mesh representation of the object, the mesh including elements from a predetermined set of first and second elements, the computer program product comprising:

a computer-readable recording medium including a substrate;

means, recorded on the medium, for directing the system to decompose the object into a mesh including a set of tetrahedra;

means, recorded on the medium, for directing the system to identify a group of first elements of the mesh as being suitable for merging into a second element from the predetermined set;

means, recorded on the medium, for directing the system to merge the identified group of first elements into the second element from the predetermined set;

means, recorded on the medium, for directing the system to display a representation of the physical attribute of the object based on the mesh representation of the object produced by the means for directing to decompose, identify, and merge; and means, recorded on the medium, for directing the system to represent the tetrahedra produced in the step of decomposing in the form of a graph which shows (i) nodes representing the tetrahedra, (ii) first node connectors representing faces shared in common between pairs of the tetrahedra, and (iii) second node connectors representing two faces, each face being of different tetrahedra which have an edge in common and have an angle therebetween which satisfies a predetermined condition.

10. A computer program product as recited in claim 9, wherein:

the elements of the predetermined set are represented as a set of respective subgraphs representing groups of tetrahedra which may be merged into respective ones of the elements of the predetermined set;

the means for directing to identify includes means, recorded on the medium, for directing the system to find a portion of the graph, the portion matching one of the respective subgraphs, and representing a group of the tetrahedra produced in the step of decomposing, which matches one of the respective subgraphs; and the means for directing to merge includes means, recorded on the medium, for directing the system to merge the group of tetrahedra represented by the portion into the respective element.

11. A computer program product as recited in claim 10, wherein:

the elements of the predetermined set are represented as a set of respective search trees representing arrangements of the nodes of the respective subgraphs into (i) a root node corresponding with a first node of the subgraph representation of the element, and (ii) other nodes corresponding with other nodes of the subgraph and having node connectors which correspond with a first and second node connector of the respective subgraphs; and the means for directing to identify includes means, recorded on the medium, for directing the system to find a portion of the graph, the portion matching one of the set of search trees.

12. A computer program product as recited in claim 11, wherein the means for directing to identify includes:

means, recorded on the medium, for directing the system to select an initial node of the graph as corresponding to a root node of the search tree;

means for means, recorded on the medium, for directing the system to search for a first group of other nodes of the graph which have connectors to at least one initial node and which have connectors to one other node of the first group, each connector corresponding with a connector between nodes of the search tree; and means, recorded on the medium, for directing the system to determine that the first group of nodes of the graph which, together, correspond with the nodes of the search tree and have corresponding connectors which correspond with a second group of elements of the mesh which are suitable for merging into one of the predetermined set of elements.

\* \* \* \* \*